United States Patent [19]

Jones

[11] 3,747,631
[45] July 24, 1973

[54] FLUID FLOW CONTROL SYSTEM
[76] Inventor: William M. Jones, 1940 Smith Drive, Titusville, Fla.
[22] Filed: June 17, 1971
[21] Appl. No.: 153,968

[52] U.S. Cl.................... 137/318, 90/12 R, 90/15
[51] Int. Cl..................... B23b 41/08, F16e 41/04
[58] Field of Search................ 137/317, 318; 138/94, 94.3, 97; 90/11 R, 12, 12.5, 151 A, 39, 40, 44

[56] References Cited
UNITED STATES PATENTS

| | | | |
|---|---|---|---|
| 940,356 | 11/1909 | Phelps | 137/318 X |
| 1,989,768 | 2/1935 | Nieman | 137/318 X |
| 2,840,100 | 6/1958 | Stephenson | 137/318 |
| 3,108,499 | 10/1963 | Duncan | 137/318 X |
| 3,385,314 | 5/1968 | Thompson | 137/318 |

Primary Examiner—Martin P. Schwadron
Assistant Examiner—David R. Matthews
Attorney—William E. Jones

[57] ABSTRACT

A fluid flow control system is provided for restricting or stopping the flow of pressurized fluids in a pipeline. This system, for example, can be installed in a pipeline which is carrying oil, and can be utilized to control such fluid, during oil well fires and in pipe lines which have been ruptured. This system includes a saddle clamp for encompassing the pipeline to seal off a portion thereof, a mechanism for cutting a port in the pipeline, and a valve device for insertion into the port to control the flow of fluid in the pipeline.

10 Claims, 9 Drawing Figures

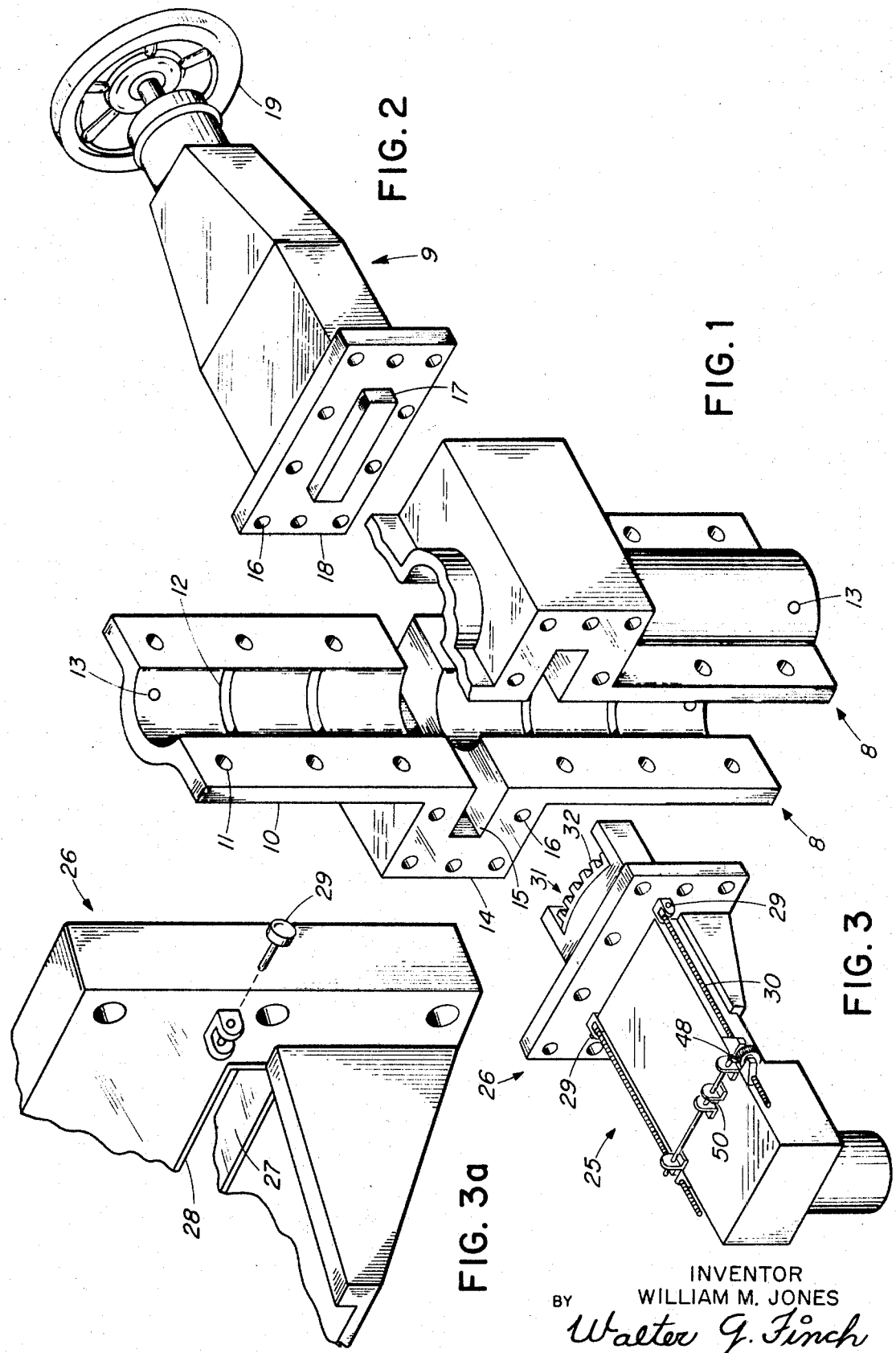

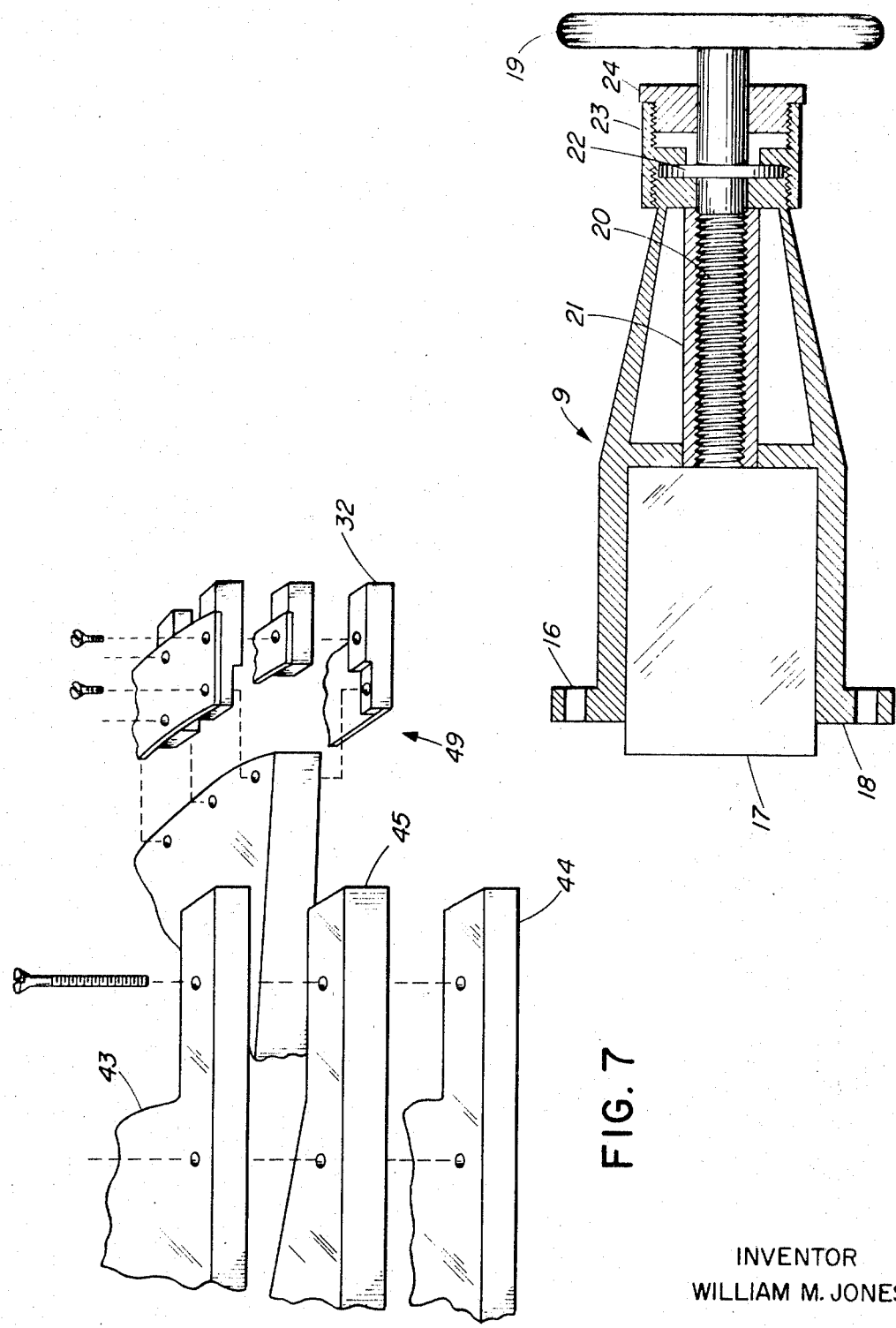

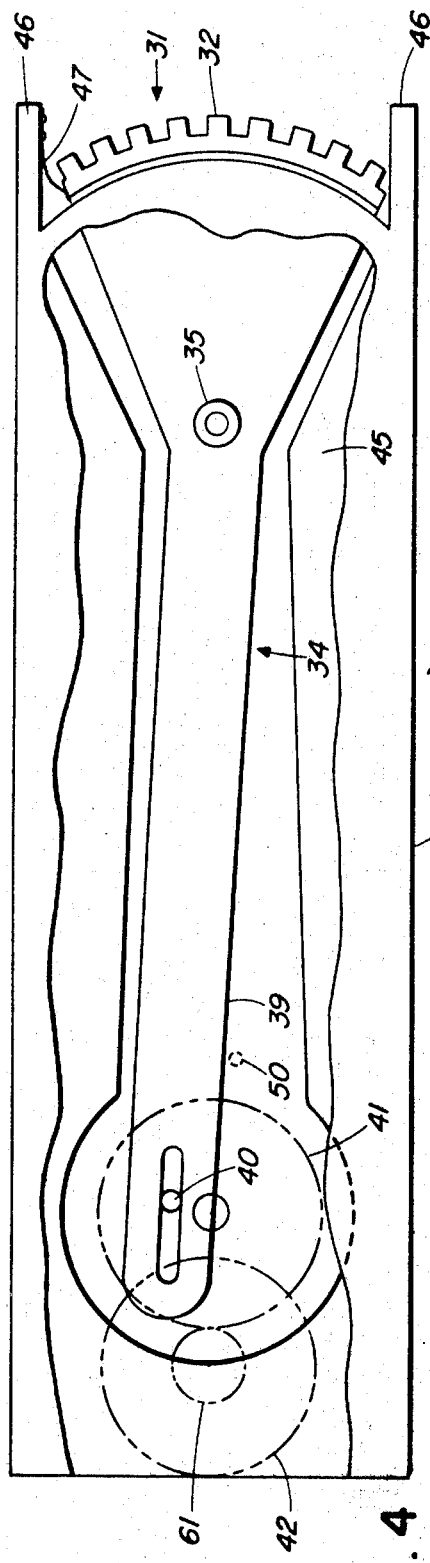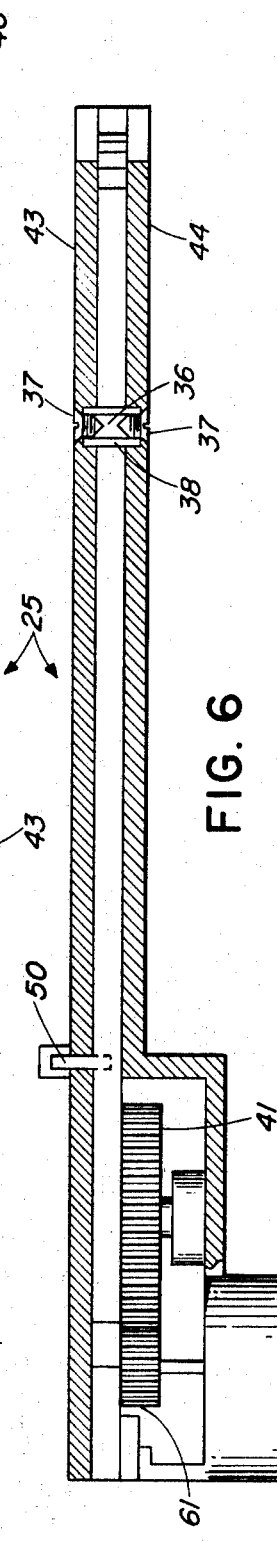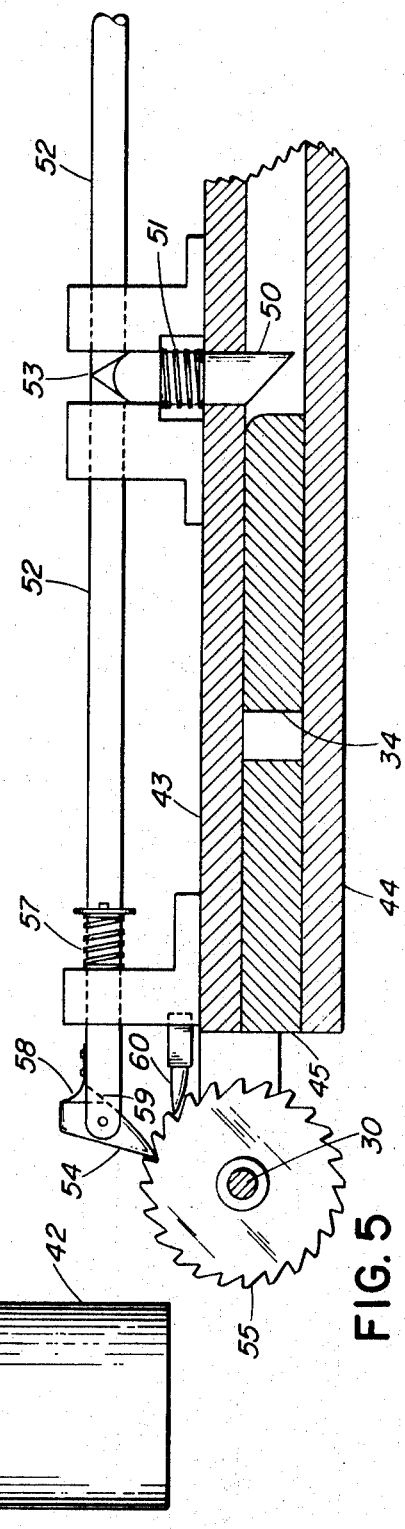

FLUID FLOW CONTROL SYSTEM

This invention relates generally to fluid flow control devices, and more particularly it pertains to a pipeline valve system arranged to shut off or control the flow of fluid in pipelines, such as oil.

There are many instances where oil well fires at sea or on land or ruptured pipelines having fluid therein, must be quickly brought under control either to extinguish the oil fires or restrict or stop the flow of fluid in such pipelines.

It is an object of this invention therefore, to provide a fluid flow control system including a gate valve device, which can be installed on an active fluid pipeline, to control the high pressure fluid therein, with no appreciable leakage or spillage of fluid occurring during installation of the system.

Still even another object of this invention is to provide a fluid flow control system for a high pressure fluid pipeline which can be utilized to restrict or stop the flow of fluid in the pipeline.

And even another object of this invention is to provide a fluid flow control system for a pipeline which can be remotely controlled after installation and which can serve as a safety device particularly in oil well operations at sea or on land.

And still even another object of this invention is to provide a fluid flow control system for pipelines including a safety valve device which can be quickly installed in instances where no valve device has previously been installed in a pipeline to control the flow of fluid therein.

These and other objects and attendant advantages of the invention will be apparent from the following detailed description and accompanying drawings in which:

FIG. 1 is a perspective view of a saddle clamp incorporating features of this invention having an inner diameter to straddle and fit securely around a pipeline, whose fluid flow therein is to be regulated.

FIG. 2 is a partial perspective view of a gate valve;

FIG. 2a is a cutaway side view of the gate valve of FIG. 2;

FIG. 3 is a partial perspective view of a cutting tool, its entrance port with supporting member, and a feed mechanism therefor;

FIG. 3a is a partial view of the cutting tool entrance port of FIG. 3, with the cutting tool removed;

FIG. 4 is a top view of the cutting tool of FIG. 2, with parts being shown in dotted lines;

FIG. 5 is a sectional view of a feed activating mechanism for the cutting tool;

FIG. 6 is a side section view showing a drive arrangement; and

FIG. 7 is an exploded perspective view of a cutting head.

Referring now to the drawings, there is shown in FIG. 1 a two piece saddle clamp 8 designed to fit securely around a pipeline having fluid, under pressure, such as a high pressure oil pipeline, which is to be controlled. The saddle clamp 8 is designed to be of sufficient length to extend a distance of approximately six times the diameter of the pipeline it is servicing.

This saddle clamp 8 is provided with flanges 10 having spaced apertures 11 arranged to receive bolts. Around the inner periphery on each portion of the clamp 8, spaced lead compression seals 12 are provided. These seals 12 are compressed on installation and they effectively seal the saddle clamp 8 to the exterior of the pipeline.

At the top and bottom of the clamp 8, there will be provided Allen type set screws 13 to further add to the mechanical security of the clamp 8. At its lengthwise center 14, the clamp 8 will be reinforced somewhat larger than the diameter of the pipeline. This horizontal square portion 14 of the clamp 8 will have a vertical thickness approximating that of the horizontal dimensions.

In the center of the horizontal square portion 14 of the clamp 8, there is cut a groove 15 which extends entirely through the saddle clamp 8 and it is somewhat wider than the diameter of the pipe. Around these grooves 15, on both sides of the saddle clamp 8, apertures 16 are drilled and tapped to receive bolts.

To these rectangular saddle valve ports or grooves 15, there are mounted on opposite sides, a gate valve 9 and a pipe cutting tool 25.

The gate valve 9 (of a non-rising stem type), as shown in FIGS. 2 and 2a, is provided with a blade 17 which is normally in a retracted position. This gate valve 9 is securely fastened to the saddle clamp 8 by means of a flange 18 having apertures 16 therein for bolts and it remains a part of the saddle valve 8.

The blade 17 is driven into the saddle valve port or groove 15 by rotating a handle 19 on the valve 9 which, in turn, turns a threaded shaft 20. This shaft 20 is positioned internal to a tapped bore 21, and it forces the tapped bore barrel 21 extending out from the valve blade 17 at the rear in a forward motion.

The threaded shaft 20 is prevented from leaving the valve 9 by means of a collar 22 which is held in by an assembly nut 23 and made leak proof by packing and a packing nut 24. The valve blade 17 is designed to have the same dimensions of the saddle valve port or groove 15 and to fit snuggly into and through the valve port or groove 15.

Referring now to FIG. 3, there is shown a cutting tool 25 and a cutting tool support 26 therefore, while in FIG. 3a there is shown a section of an entrance port 27 and a nylon or teflon seal 28 which surrounds the interior of the port or groove 15.

This seal 28 is to provide a gasket for the cutting tool 25 during cutting operations. Removable locking pins 29 are utilized to secure threaded feed rails 30 when the cutting tool 25 is operating. The cutting tool 25 can be quickly removed by removing both pins 29.

In FIG. 3, is to be noted that a cutting head 31 is provided which consists of three rows of tungston carbide tool bits 32, shown best in FIG. 7, whose total cutting thickness is comparable to the rectangular port or groove 15 in the saddle clamp 8.

The tool bits 32 are so spaced as to overlap each other horizontally during the cutting stroke. If the cutting stroke is one inch, the leading edge of the tool bits 32 are designed to be approximately 7/8 inches apart. This would give an overlap on the cutting stroke of 1/8 inch. This would assure a good clear cut since the feed mechanism is to start feeding on the cutting stroke.

Pawl mechanisms are provided to advance the cutting bits 32. They are located to the rear of the cutting tool 25 near the top thereof. These pawl mechanisms 48 are actuated by a plunger 50 located on the top of the cutting tool 25 between the pawl mechanisms 48.

In FIG. 4, there is shown a top view of the cutting tool 25 having a cutter blade 34. This cutting tool 25, with its cutter blade 34, is so proportioned that the arc of the cutter head represents a segment of a circle, the diameter of which is greater than the diameter of the circle of the pipe being cut. This is done purposely to reduce the possibility of multiple contacts of the cutting tool bits 32 during the cutting operation.

It is also to be noted that the cutting action carries past the diameter of the pipe being cut and extends into the clean portion on both sides of the rectangular port or groove 15.

A fulcrum 35 is provided as shown in FIG. 4, for the blade 34 which is needed to impart motion to the cutting head 31. It is located at the exact radius of the arc. The fulcrum 35 would best be of a roller or ball bearing type, as shown by the bearing 36.

This bearing 36, as shown in FIG. 6, can be recessed into the upper and lower assembly plates 43 and 44 to prevent any unwarranted action. This bearing 36 can be further reinforced by means of screws 37 extending into a screw plug 38 in the center of the bearing 36.

To the rear of the fulcrum 35, the cutter blade 34 maintains a width of sufficient size to give the needed strength to the cutting operation. An arm 39, shown in FIG. 4, extends to the rear of the fulcrum 35 to a point which intersects a crank pin 40 located on a driven gear 41.

The distance the cranking pin 40 is located away from the center of the large gear 41, plus the relationship of the length of the cutter arm 39 with regards to the cutting head 31, distance from the fulcrum 35 will determine (1) the mechanical power advantage for the cutting operation, and (2) the length of rotational travel experienced by the cutting head 31. These parameters can be optimized for individual needs. The cutter tool 25 can be driven by an electrical motor 42, or air power according to the needs established.

It is probably prudent that the cutting arm 39 be arranged not to make over 2 strokes per second and most likely one.

The cutter blade arm 39 and the cutting blade 31 are sandwiched between two bearing surface plates 43 and 44 as previously mentioned in connection with FIG. 6. These plates 43 and 44 are joined together by means of a third plate 45 shown best in FIG. 5. This unit, when assembled, will be leak proof since no external openings are required.

These plates 43, 44, and 45 are assembled by means of machine screws and they add mechanical integrity and strength to the cutting tool 25.

Projections out the front of the cutting tool 25 are used to serve as guides. Safety guards 46, as shown in FIG. 4, are provided to prevent the cutting blade 31 from cutting into the valve blade 7 shown in FIG. 2a during the cutting operation.

On the inside of each guard 46, there is placed a segment of a steel spring 47 which extends from the guard 46 to the cutting head 31, as shown in FIG. 4. This spring 47 is made the thickness of the cutting head 31 and it is used to scavenge chips and prevent them from entering into the cutting tool 25. Normal operation in an active fluid line will be sufficient to remove the chips once the cutting operation is started.

A view of the cutting head 31 is best seen in FIG. 7 which shows a method proposed for spacing and securing the cutting tool bits 32 to a cutting tool bit holder 49. The cutting tool bits 32 and the cutting tool bit holder 49 are, when assembled, not to exceed the measurements of the heights of the saddle valve port or groove 15 shown in FIG. 1.

This cutting head 31, when operating, will be capable of making a clean cut through the saddle valve port or groove 15 to cut away all surplus material. The cutting tool bits 32 may be sharpened and angled by one skilled in the state of the art.

It is further desirable that the cutting bits 32 on each consecutive row be staggered slightly to the rear of the one on top. This would further decrease the possibility of multiple contact of the cutting bits during the start of the cutting operation.

The cutting feed system shown in FIG. 5 is operated by means of the cyclic action of the cutter arm 39. At the beginning of a cutting stroke, as this arm 39 moves to the right, it will come into contact with the plunger 50 which is spring loaded at 51 to remain in a down position. The forward motion of the cutter arm 39 will impart an upward action on the plunger 50 and the plunger 50 will separate push rods 52 at junction 53.

This action will drive the push rods 52 outward to operate the pawl mechanisms 48. This will cause a pawl 54 to contact teeth on a ratchet gear 55 causing the gear 55 to rotate several degrees. This rotation of the ratchet gear 55 will cause gear 55 to advance along the threaded feed rail 30 driving the cutting tool 25 into the saddle clamp port or groove 15 and advance the cutting bits 32 into the pipe being cut.

The feeder plunger 50, is held up during the cutting stroke since the plunger 50 is off center to the left, as shown in FIG. 4 and the cutter arm 34 does not traverse past this location. On the return stroke, the plunger 50 will be forced down by the action of spring 51, and push rods 52 will return to a closed position due to action of the spring 57. The pawl 54, which is held by means of action of the leaf spring 58, and mechanically rigid because of mechanical contact with a portion 59 of the push rod 52, will return, also skipping over the several teeth it has advanced in the ratchet gear 55. A lock pawl arrangement 60 is provided to prevent the return of the ratchet gear 55 when advanced.

It is to be noted that only the left side feed action is shown. The right side is identical in action. The left side feed mechanism will be threaded for left hand threads, with the right for right hand threads.

At the end of the cutting action, pins 29 are removed from the feed rods. The valve 9, of FIG. 2 is operated as previously described to drive the blade 17 into the rectangular port or groove 15, sealing off the severed pipe. Action of the blade 17 entering the port or groove 15 will cause the blade 17 to contact the cutter safety guards 46. Continued movement of the valve blade 17 will force the cutting tool 25 out on the cutting tool support 26. The cutting tool 25 is then removed. The cutting tool support 26 can then be removed and replaced permanently with a solid metal plate of appropriate size and shape.

It is to be noted that the valve 9, once installed, can be electronically or mechanically controlled by suitable apparatus from a remote point.

Obviously many modifications and variations of the present invention are possible in light of the above teachings. It is, therefore, to be understood that within the scope of the appended claims the invention may be practiced otherwise than as specifically described.

What is claimed is:

1. A fluid flow control system for controlling the flow of a pressurized fluid in a pipeline, comprising, means for encompassing a portion of the external surface of a pipeline and positioned adjacent thereto, said means having a port of greater diameter than said pipeline extending therethrough and having a section of the encompassed pipeline contained therein, means extending into said port in said encompassing means for cutting away the port-contained section of the encompassed pipeline as an extension of said port in said encompassing means so that remaining adjacent portions of the pipeline open into said port, and means for insertion into said port in said encompassing means to selectively cover the portions of the pipeline which open into said port for controlling the flow of fluid in said pipeline.

2. A fluid flow control system as recited in claim 1, wherein said encompassing means includes a two-piece saddle clamp arranged to fit securely around said pipeline.

3. A fluid flow control system as recited in claim 2, wherein said saddle clamp is of sufficient length to extend a distance of approximately six times the diameter of said pipeline.

4. A fluid flow control system as recited in claim 1, wherein said means for cutting away the port-contained section of the encompassed pipeline includes an oscillating cutting mechanism.

5. A fluid flow control system as recited in claim 4, wherein said oscillating cutting mechanism has a cutter head with a cutting blade so proportioned that the arc of the cutter head represents a segment of a circle, the diameter of which is greater than the diameter of said pipeline.

6. A fluid flow control system as recited in claim 4 wherein the cutting tool has the same dimensions as and fits into said port effectively covering said severed pipe line after the cutting operation.

7. A fluid flow control system as recited in claim 1, wherein said insertion means includes a gate valve.

8. A fluid flow control system as recited in claim 7, wherein gate valve has the same dimensions as and fits into said port.

9. A fluid flow control system as recited in claim 1 wherein said port has openings formed at opposite ends thereof, and further comprising, a cutting means support secured to said encompassing means to cover one of said port openings and support said cutting means within said port, and a support for containing movably said insertion means, said insertion means support being secured to said encompassing means to cover another of said port openings with said insertion means being aligned with said port.

10. A fluid flow control system as recited in claim 9 which further comprises means for permitting the complete removal of said cutting means from said port and said cutting means support so that said insertion means can be moved completely and unobstructedly into said port.

* * * * *